United States Patent [19]

DeVault

[11] Patent Number: 5,596,149
[45] Date of Patent: Jan. 21, 1997

[54] PRESSURE MEASUREMENT TAP FOR A PRESSURIZED FLUIDIZED BED

[75] Inventor: Douglas J. DeVault, Rootstown, Ohio

[73] Assignee: The Babcock & Wilcox Company, New Orleans, La.

[21] Appl. No.: 547,007

[22] Filed: Oct. 23, 1995

[51] Int. Cl.⁶ ........................................................ G01L 7/00
[52] U.S. Cl. ............................................. 73/756; 73/706
[58] Field of Search ........................ 73/706, 756; 34/362, 34/413; 110/189, 229, 245; 431/19, 170; 432/58

[56] References Cited

U.S. PATENT DOCUMENTS

| | | | |
|---|---|---|---|
| 2,663,272 | 12/1953 | Thring et al. | 110/189 |
| 3,295,374 | 1/1967 | Sawada et al. | 73/395 |
| 3,559,623 | 2/1971 | Decamps | 122/6.5 |
| 3,910,209 | 10/1975 | Albrecht et al. | 110/189 |
| 4,017,253 | 4/1977 | Wielang et al. | 431/170 X |
| 4,552,529 | 11/1985 | Brännström et al. | 432/58 |
| 4,591,331 | 5/1986 | Moore | 110/189 X |
| 4,651,572 | 3/1987 | Albertz et al. | 73/861.63 |
| 5,241,863 | 9/1993 | Molnar | 73/706 |

*Primary Examiner*—Richard Chilcot
*Assistant Examiner*—Paul D. Amrozowicz
*Attorney, Agent, or Firm*—Robert P. Bennett, Jr.; Robert J. Edwards

[57] ABSTRACT

A pressure measurement tap for use in a pressurized fluidized bed for preventing a flow of particulate matter into the measurement tap opening. The pressure measurement tap has an inner pipe for providing purge air through the pressure measurement tap which carries the purge air past a pressure gauge conduit and provides for greater accuracy in measurements. A second embodiment has a constant source of purge air provided to the inner pipe.

5 Claims, 2 Drawing Sheets

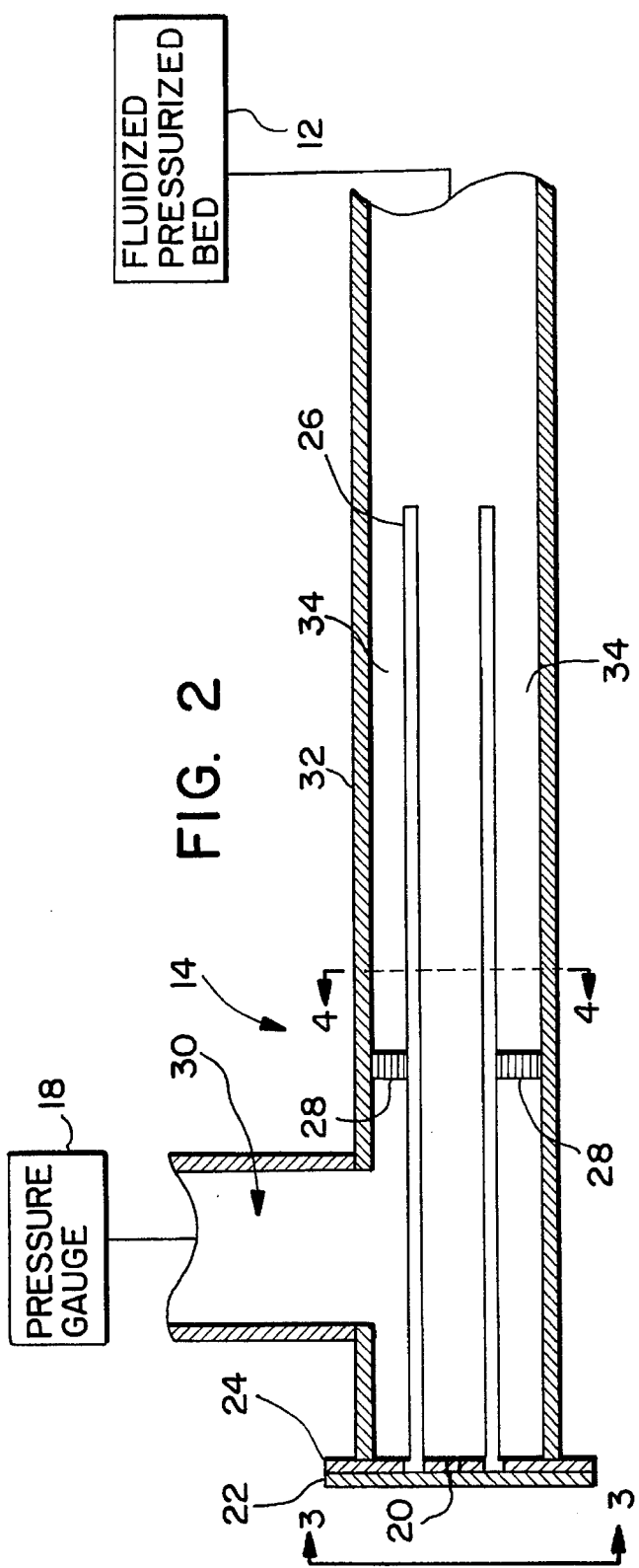
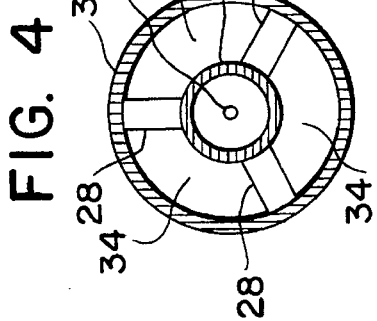
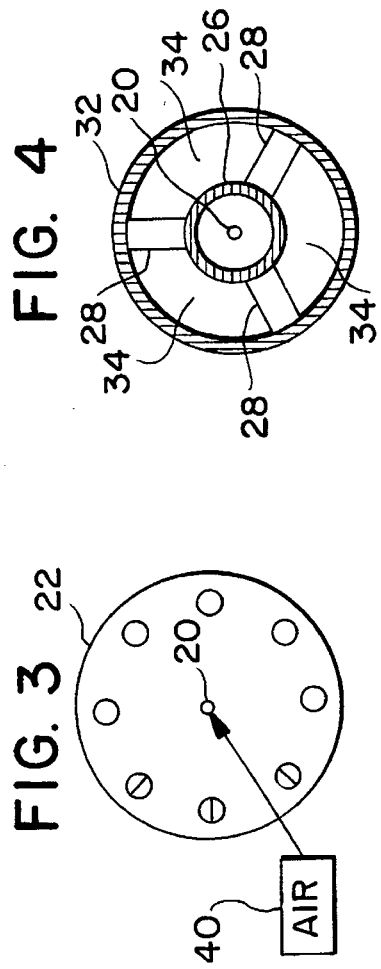

PRESSURE MEASUREMENT TAP FOR A PRESSURIZED FLUIDIZED BED

BACKGROUND OF THE INVENTION

1. Field of the Invention

The present invention relates to pressure measurement in a pressurized fluidized bed and more particularly to maintaining the integrity of a pressure measurement tap and keeping it clear of particulate matter.

2. Description of the Related Art

It has been a continuing problem to take a pressure measurement from a pressurized fluidized bed because particulate matter from the fluidized bed tends to become clogged in the pressure measurement tap. One method used to prevent the flow of particulate into the tap is to use a pressure measurement tap which has an opening for a purge air flow. The purge air flow is opposite the flow of particulate matter and forces the particulate back into the pressurized fluidized bed. The air flow has to be rapid enough to prevent the particulate matter from clogging the pipe but slow enough not to effect the pressure reading being taken upstream of the inserted pipe.

U.S. Pat. No. 4,552,529 discloses one variation of this method. In this patent the pressure tap is off of a "T" connection with the purge air constantly flowing past the pressure measurement point. This produces high fluctuations between readings and also has a small range of pressure differentials in which effective readings may be taken.

U.S. Pat. No. 5,241,863 discloses a device for isolating the pressure measurement gauge from the particulate air that might be flowing in through the measurement point tube. The particulate air is isolated from the pressure measurement tube by a baffle in a chamber. It discloses the use of a purge air inlet located on the pressure measurement gauge side of the baffle. Its purpose is to keep the particulate matter from forming and building up in the measurement tube or flowing past the baffle. The measurement gauge opening is not isolated from the purge air in this design.

U.S. Pat. No. 4,651,575 teaches the use of a venturi tube to speed the gas or fluid through the measurement point to keep the measurement tube clean. In addition, this patent discloses two points where purge air can be vented into the venturi tube to also aid in the cleaning effect.

In U.S. Pat. No. 3,295,374, a device using purge air flowing past the point of measurement to keep the measurement point clean of particles is disclosed. The device has a control mechanism for controlling the purge air flow.

SUMMARY OF THE INVENTION

It is a primary object of the invention to substantially eliminate the flow of particulate matter into the pressure measurement tap.

Accordingly, the invention comprises a "T"-shaped pipe having the perpendicular member leading to a pressure gauge or other pressure measuring device. The elongated member of the "T" has two ends, one of which is open and positioned at a point where a pressure measurement is desired in a fluidized bed or pressurized fluidized bed.

Inside the elongated member, a straight pipe of smaller diameter is supported by blocks arranged in a manner to allow a direct pressure reading in the annulus created by the gases in the fluidized bed. One end of the straight pipe is open and extends toward the measurement point, past the opening of the perpendicular member for a certain distance. The second end of the straight pipe is airtightly connected to a slip-on flange which also seals the second end of the elongated member of the "T"-shaped pipe. A blind flange is fitted over the slip-on flange and further seals the second end of the elongated member. A small orifice is provided at approximately the center of the flanges that goes completely through the flanges.

Purge air from a region of higher pressure outside the elongated member can enter the straight pipe through the orifice. The purge air that is allowed into the straight pipe is carried past the opening of the perpendicular member before being allowed into the elongated member and does not affect the pressure measurement. This innovation substantially eliminates error that would be caused by variable airflow past the opening.

The purge air prevents particles from entering the open end of the "T"-shaped pipe and subsequently clogging it. This results in a good measurement of the pressure of the fluidized bed that the "T"-shaped pipe is connected to and reduces the maintenance needed for the measuring pipe to keep it clean.

It is a further object of the invention to provide a pressure tap which is capable of providing accurate pressure readings at reduced pressure loads.

Additionally, the present invention is provided with a purge air orifice using a much higher Reynolds number for the purge air flow which allows a greater flow through the purge pipe for keeping the pipe clear of particulate without interfering with the pressure measurement.

It is further envisioned that the present invention could have a constant flow purge air source connected at the blind flange in order to make the invention useful in other applications where there is no preexisting pressure difference to take advantage of.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE DRAWINGS

In the drawings:

FIG. 2 is a side sectional view of the present invention;

FIG. 3 is a end view taken along line 3—3 of FIG. 2; and

FIG. 4 is a sectional view taken along line 4—4 of FIG. 2.

DESCRIPTION OF THE PREFERRED EMBODIMENTS

Figure 1:
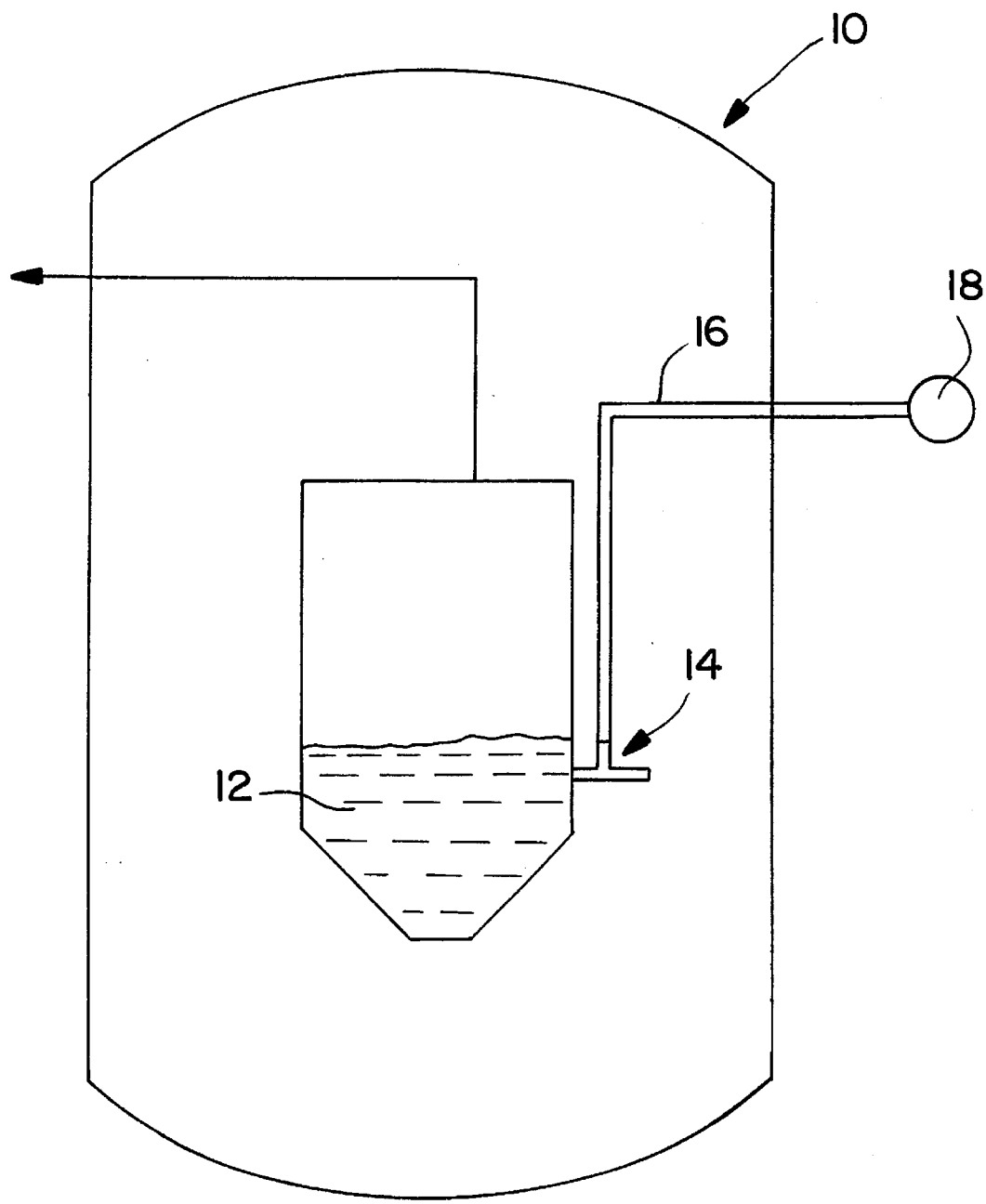
FIG. 1 is a schematic diagram of the present invention used in a fluidized bed.

Referring to the drawings, FIG. 1 shows a pressure vessel 10 surrounding a pressurized fluidized bed 12 and a pressure measurement tap 14. Pressure measurement tap 14 is inserted at a point in the pressurized fluidized bed 12 where a pressure measurement is desired. A conduit 16 conveys the pressure from the pressure measurement tap 14 to a pressure gauge 18. It should be noted that pressure gauge 18 (as shown) could alternatively be a pressure transmitter for relaying the pressure reading to a control device.

Turning now to FIG. 2, the pressure measurement tap 14 of the invention is shown in greater detail.

Outer pipe 32 is a "T"-shaped member. The elongated section of outer pipe 32 is connected to the pressurized fluidized bed 12 at a point selected for pressure measurement. The perpendicular member 30 of outer pipe 32 is connected to a pressure gauge 18. It should be noted that pressure gauge 18 could also be a pressure transmitter and should not be limited solely to a pressure gauge, although that is shown in this embodiment.

Within the elongated section of outer pipe 32, inner pipe 26 extends concentrically along the longitudinal axis of outer pipe 32 creating an annular gap 34 between the two pipes 26, 32. Support blocks 28 are arranged within annular gap 34 at 120 degree intervals around inner pipe 26 and support it within outer pipe 32. The support blocks 28 are advantageously sized to leave a substantial space between them for a direct pressure reading in the annulus created by the gases in the fluidized bed and do not completely block the annular gap 34.

At the end of the elongated section of outer pipe 32 opposite the fluidized pressurized bed 12 are slip-on flange 24 and blind flange 22. The flanges 22, 24 airtightly seal the ends of outer pipe 32 and inner pipe 26. An orifice 20 is provided through blind flange 22, at approximately the center of inner pipe 26. Thus, the end of outer pipe 32 is entirely sealed off while the orifice 20 provides an opening only into inner pipe 26.

Purge air which is of a higher pressure than the pressure inside the pressurized fluidized bed 12 can flow through orifice 20 into inner pipe 26. The purge air flowing through inner pipe 26 prevents particulate matter from pressurized fluidized bed 12 from flowing into outer pipe 32 and clogging it. Additionally, the purge air allowed through orifice 20 is carried past the gauge outlet 30 by inner pipe 26 preventing fluctuations in measurements taken by pressure gauge 18 while still maintaining the integrity of the pressure measurement tap 14.

FIG. 3 is an end view of the pressure measurement tap 14 in which the location of the orifice 20 is shown more clearly. The orifice 20 is shown located in approximately the center of blind flange 22 which is connected to the outer pipe 32 through slip on flange 24. The size of the orifice 20 is chosen such that purge air is only allowed into inner pipe 26 and the air flow characteristics of the purge air may be predicted from published data. In cases where the fluidized bed is not in a pressure vessel, a separate source of purge air shown at 40, is used.

FIG. 4 more clearly shows the orientation of the support blocks 28 within the annular gap 34. It can be seen how the support blocks 28 are spaced 120 degrees apart from each other between the outer pipe 32 and inner pipe 26. Blocks 28 support inner pipe 26 but do not completely block the annular gap 34. Orifice 20 is shown located in approximately the center of inner pipe 26.

It is envisioned that the pressure tap 14 may be used in both atmospheric fluidized beds and pressurized fluidized beds or in other applications where particulate matter may become clogged in a pressure measurement tap. In the case of an atmospheric fluidized bed or where a source of higher pressure air is not immediately available outside the orifice 20, a constant purge air flow may be provided through inner pipe 26 by attaching means for providing the purge air to the orifice 20 to the flanges 22,24.

While a specific embodiment of the invention has been shown and described in detail to illustrate the application of the principles of the invention, it will be understood that the invention may be embodied otherwise without departing from such principles.

What is claimed is:

1. A pressure measurement tap for a fluidized bed, the tap comprising:

an elongated pipe having a first end connected to the fluidized bed, a second end, a longitudinal axis, and an outlet adjacent the second end;

a conduit connected to the elongated pipe at the outlet;

pressure measuring means connected to the conduit; and an inner pipe, within the elongated pipe and extending parallel to the longitudinal axis, for conveying a purge air into the elongated pipe from the second end of the elongated pipe, past the outlet without coming in contact with the outlet, to a location between the outlet and the first end of the pipe.

2. A pressure measurement tap according to claim 1, wherein the the inner pipe has one end adjacent the second end of the elongated pipe, and an open end positioned between the outlet and the first end of the elongated pipe, the inner pipe defining a gap between the inner pipe and elongated pipe.

3. A pressure measurement tap according to claim 2, wherein the inner pipe is further comprised of a means for supporting the inner pipe within the elongated pipe and a seal airtightly connected to the elongated pipe at the second end and to the inner pipe at the end adjacent to the second end, and having an orifice in the seal for allowing purge air into the inner pipe.

4. A pressure measurement tap according to claim 3, wherein the fluidized bed is within a pressure vessel containing a pressure which is higher than the pressure in the fluidized bed, the purge air entering into the orifice from the pressure vessel.

5. A pressure measurement tap according to claim 3, including pressure means connected to the orifice for supplying the purge air.

* * * * *